(12) United States Patent
Oerding et al.

(10) Patent No.: US 9,577,567 B2
(45) Date of Patent: Feb. 21, 2017

(54) METHOD FOR OPERATING A WORK APPARATUS HAVING AN ELECTRIC MOTOR

(71) Applicant: Andreas Stihl AG & Co. KG, Waiblingen (DE)

(72) Inventors: Jochen Oerding, Ludwigsburg (DE); Rene Wichert, Durlangen (DE); Christian Renz, Biberach (DE); Gernot Liebhard, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 13/758,626

(22) Filed: Feb. 4, 2013

(65) Prior Publication Data
US 2013/0200837 A1 Aug. 8, 2013

(30) Foreign Application Priority Data
Feb. 4, 2012 (DE) .................. 10 2012 002 270

(51) Int. Cl.
*H02P 1/00* (2006.01)
*H02P 29/00* (2016.01)
*A01D 69/02* (2006.01)
*A01D 46/26* (2006.01)

(52) U.S. Cl.
CPC ............... *H02P 29/00* (2013.01); *A01D 69/02* (2013.01); *H02P 6/34* (2016.02); *A01D 46/26* (2013.01)

(58) Field of Classification Search
CPC ....... H02H 7/0811; H02H 7/0833; H02P 7/00; H02P 27/085; H02P 6/14; H02P 27/08; H02P 7/29; B25B 21/02; B23Q 5/041; B23Q 5/10; H02K 7/145; A01D 34/78

USPC ... 318/139; 361/23, 31, 54, 87; 56/233–239; 301/196, 194, 165
See application file for complete search history.

(56) References Cited

U.S. PATENT DOCUMENTS

| 3,650,099 A | 3/1972 | Sitter |
| 3,660,671 A | 5/1972 | Peterson |
| 3,710,215 A * | 1/1973 | Johnston ................. H02P 23/08 318/801 |
| 4,979,477 A | 12/1990 | Nickel et al. |
| 5,211,144 A | 5/1993 | Collins et al. |
| 5,473,875 A | 12/1995 | Zehavi et al. |
| 6,474,300 B1 | 11/2002 | Steffen |

(Continued)

FOREIGN PATENT DOCUMENTS

| DE | 10 2007 046 111 A1 | 4/2009 |
| EP | 0 283 945 A2 | 9/1988 |

(Continued)

*Primary Examiner* — Eduardo Colon Santana
*Assistant Examiner* — Bickey Dhakal
(74) *Attorney, Agent, or Firm* — Walter Ottesen, P.A.

(57) ABSTRACT

An electric motor in a work apparatus has a power characteristic line which runs between a lower rotational speed of the electric motor and an upper rotational speed of the electric motor. The power characteristic line has a power characteristic with a pronounced maximum (M) and an operating plateau (AP) which lies in a working rotational speed range (AD) of the work apparatus. A method for operating the electric motor provides for configuring the position of the operating plateau (AP) to be variable with respect to the rotational speed of the electric motor to achieve stable operating points over a wide rotational speed range.

21 Claims, 2 Drawing Sheets

(56) References Cited

U.S. PATENT DOCUMENTS

| | | |
|---|---|---|
| 6,672,044 B1 | 1/2004 | Zehavi et al. |
| 6,700,212 B2 * | 3/2004 | Ackermann et al. ....... 290/36 R |
| 7,538,503 B2 * | 5/2009 | Machens et al. ............ 318/268 |
| 7,652,438 B2 | 1/2010 | Rosskamp |
| 7,983,830 B2 * | 7/2011 | Yu et al. ...................... 701/102 |
| 8,322,326 B2 | 12/2012 | Gegg et al. |
| 8,380,421 B2 * | 2/2013 | Yu et al. ...................... 701/102 |
| 8,418,891 B1 | 4/2013 | Harris |
| 8,639,430 B2 * | 1/2014 | Yu et al. ...................... 701/102 |
| 8,723,453 B2 * | 5/2014 | Rosskamp et al. ............. 318/17 |
| 2001/0010267 A1 | 8/2001 | Kawarai |
| 2002/0100438 A1 | 8/2002 | Raffenberg et al. |
| 2003/0178211 A1 | 9/2003 | Uhl |
| 2004/0090195 A1 | 5/2004 | Motsenbocker |
| 2004/0134175 A1 | 7/2004 | Osborne |
| 2004/0182587 A1 | 9/2004 | May et al. |
| 2004/0263101 A1 | 12/2004 | Kolomeitsev et al. |
| 2005/0004736 A1 | 1/2005 | Belcher et al. |
| 2005/0230130 A1 | 10/2005 | Strasser et al. |
| 2006/0086337 A1 | 4/2006 | Nickel |
| 2006/0290304 A1 | 12/2006 | Marcinkiewicz et al. |
| 2007/0085496 A1 | 4/2007 | Philipp et al. |
| 2007/0182350 A1 * | 8/2007 | Patterson ................ G05D 13/62 318/432 |
| 2007/0205732 A1 | 9/2007 | Beifus |
| 2008/0011251 A1 | 1/2008 | Tanaka |
| 2008/0041146 A1 | 2/2008 | Leufen |
| 2009/0018745 A1 | 1/2009 | Prasetiawan et al. |
| 2010/0218966 A1 | 9/2010 | Liebhard et al. |
| 2010/0224384 A1 | 9/2010 | Gwosdz et al. |
| 2010/0243699 A1 | 9/2010 | Largo |
| 2011/0234133 A1 * | 9/2011 | Hano ...................... H02P 6/182 318/400.21 |
| 2011/0284255 A1 | 11/2011 | Ookubo et al. |
| 2012/0060642 A1 * | 3/2012 | Yamaguchi ............... B60T 7/06 74/560 |
| 2012/0168189 A1 | 7/2012 | Eckert |
| 2012/0193112 A1 | 8/2012 | Gwosdz et al. |
| 2012/0312570 A1 | 12/2012 | Wanek et al. |
| 2013/0137548 A1 * | 5/2013 | Velamakanni et al. ....... 477/181 |
| 2013/0199812 A1 | 8/2013 | Dangelmaier et al. |

FOREIGN PATENT DOCUMENTS

| | | |
|---|---|---|
| JP | 62293990 A * | 12/1987 |
| WO | 2009/044934 A1 | 4/2009 |

* cited by examiner

METHOD FOR OPERATING A WORK APPARATUS HAVING AN ELECTRIC MOTOR

CROSS REFERENCE TO RELATED APPLICATION

This application claims priority of German patent application no. 10 2012 002 270.0, filed Feb. 4, 2012, the entire content of which is incorporated herein by reference.

FIELD OF THE INVENTION

The invention relates to a method for operating a work apparatus having an electric motor, as well as to a work apparatus having a tool driven by an electric motor.

BACKGROUND OF THE INVENTION

German patent publication DE 10 2007 046 111 A1 discloses a portable, handheld work apparatus which is configured as a harvesting apparatus. A drive motor drives a shaking rod, which is hooked on a branch to be harvested via a hook, by means of a crank drive. In dependence on the rotational speed of the drive motor, a shaking vibration develops which detaches the fruit to be harvested from the shaken branch. Different degrees of ripeness of the fruits as well as different types of fruits require different shaking vibration frequencies, wherefore the user must adapt the drive rotational speed of the harvesting apparatus according to the fruits to be harvested, their degree of ripeness and the strength of the branch to be shaken.

In such handheld work apparatuses, continuous operation with reduced rotational speed can be advantageous. Advantageously, a rotational speed is set in dependence on the degree of ripeness of the fruit to be harvested and the strength of the branch to be shaken. Operation with reduced rotational speed can also be desirable for noise reduction. For this, the user must set the desired rotational speed by partially depressing the operating handle, which is uncomfortable and not very ergonomic when the user has to hold the operating handle in a partially depressed position for a relatively long period of time.

Also in chain saws having an electric motor for driving a saw chain, as is disclosed in United States patent application publication 2010/0218966, a reduced rotational speed can be practical for certain types of tasks, for example cutting branches.

U.S. Pat. No. 7,652,438 discloses a power characteristic line for an electric motor in an electric work apparatus for agriculture, forestry and gardening, whose power characteristic line has a maximum with respect to the rotational speed. During operation, the user selects different operating points on the characteristic line by changing the operating rotational speed. Operating points, which lie ahead of a power maximum of the characteristic line, are unstable operating points and are very difficult to maintain for a user; operating points beyond the maximum of the power characteristic line are stable operating points which the user can easily run up to and maintain.

SUMMARY OF THE INVENTION

It is an object of the invention to provide a method for operating an electric motor in a work apparatus with which the user can work at a stable work operating point at any arbitrarily desired rotational speed over a large operating range of the electric drive. Further, a work apparatus having a tool driven by an electric motor is provided for performing the method.

The method of the invention is for operating an electric motor in a work apparatus having a power characteristic line between a lower rotational speed of the electric motor and an upper rotational speed of the electric motor wherein the power characteristic line is configured so as to cause the power characteristic to have a pronounced maximum (M) and an operating plateau disposed in an operating rotational speed range (AD) of the work apparatus. The method includes the step of shifting the position of the operating plateau (AP) with respect to the rotational speed (n) of the electric motor.

The power characteristic line of an electric motor, which is connected to a voltage source via a control unit, as a drive motor in a work apparatus can be electronically modified and has a pronounced maximum between a lower and an upper rotational speed. With increasing rotational speed, an operating plateau can adjoin the maximum, the electric power of the electric motor only changing a small amount, expediently remaining approximately the same, over the extent of the operating plateau. According to the invention, the position of the operating plateau over the rotational speed of the electric motor can be shifted so that the operating plateau always lies in a selected working rotational speed range of the work apparatus.

Instead of an interruption or a cutting of the characteristic line of an electric motor, the shifting of the position of the operating plateau advantageously occurs in such a manner that the power characteristic of the power characteristic line essentially remains unchanged. The power characteristic describes a course or the form of the power characteristic line as a function of the rotational speed, in which the power increases with rotational speed from the startup to a power maximum, and an operating plateau with only a slight change in power with respect to the rotation speed is established after the power maximum, in order to drop sharply at the end of the operating plateau with a further increasing rotational speed.

The shifting of the position of the operating plateau with respect to the rotational speed is done by setting a desired rotational speed range, in particular a desired rotational speed. Hereby, the power characteristic line is purposefully scaled to the preselected working rotational speed range or to the preselected working rotational speed of the electric work apparatus.

Advantageously, the power characteristic line is scaled either in the direction of the axis of the rotational speed or in the direction of the axis of the rotational speed and in the direction of the axis of the power. Hereby, it is advantageous that the scaling is performed in such a manner that the power characteristic line lies below a thermal power limit of the electric motor. Expediently, the power characteristic line is scaled with the same ratio of the axes.

The electronic configuration of the power characteristic line of the electric motor is done in such a manner that the operating plateau connects to a maximum of the received electric power; wherein the electric power received in the region of the operating plateau with respect to the rotational speed only varies minimally or is approximately the same. The operating plateau, in the case of increasing rotational speed, has an end after which the electric power drops sharply with increasing rotational speed. This configuration produces a power characteristic of the electric motor which, with a scaling to a desired working rotational speed, is changed in terms of absolute values, however is essentially unchanged in terms of the form of the characteristic line which represents the power characteristic.

When scaling the power characteristic line, regardless in which form, an upper thermal power limit of the received electrical power of the electric motor is not exceeded on a sustained basis.

A work apparatus for performing the method is also provided. An electric motor which drives a tool is provided as the drive motor. The electric motor is connected to an energy source via a control unit, whereby (expediently via the control unit) the power characteristic line of the electric motor is formed with a pronounced maximum and an operating plateau which lies in a working rotational speed range of the work apparatus. The control unit is connected to an electrical adjusting device for adjusting the position of the operating plateau with respect to the rotational speed of the electric motor by the user. In response to an adjustment signal of the adjusting device, the control unit will perform such a change of the power characteristic line of the electric motor so that every working rotational speed preselected by the user lies at a stable work point. With the adjusting device, the user therefore not only changes the working rotational speed range of the driving electric motor but also, via the control unit, the position of the power characteristic line in such a manner that a stable operating point is given by the working rotational speed selected by the user. This is possible in a simple manner via the control unit itself because the power characteristic line of the electric motor—in particular configured as an EC motor—is an electronically configured power characteristic line.

Advantageously, the user can change the rotational speed range of the electric motor during operation of the electric motor, that is during the use of the work apparatus, until the user finds a practical rotational speed for the work process. Because the control unit simultaneously shifts, scales or changes the power characteristic line such that the desired working rotational speed with a further increasing working rotational speed lies on the operating plateau behind the power maximum, a stable operating point is given for the rotational speed selected by the user. This operating point can be easily run up to and maintained by the user.

Expediently, each of the arbitrarily selected working rotational speeds set by a user via the adjusting device corresponds to an operating point which lies on a shifted operating plateau of the electronically adapted power characteristic line.

The adjusting device for changing the rotational speed and thus for changing the power characteristic line is to be actuated via an adjusting member arranged on the housing, which is advantageously disposed in the handle region of the work apparatus and thus can be easily reached by the user—even during operation of the work apparatus. A potentiometer, a button or the like can be expedient as the adjusting member. Advantageously, a rotational speed desired by the user is run up to by operating a rotational speed setting element and then the rotational speed which was run up to is assumed by the electronics by pressing a button, for example an OK button, the electronics correspondingly changing the characteristic line with the operating plateau. After pressing a reset button, the setting to the rotational speed which was run up to is reset.

The driving electric motor is expediently an electronically commutated electric motor, wherein the control unit generates the commutation whereby the driving rotational field of the electric motor is generated. By changing the driving rotational field via the control unit, the power characteristic line of the electric motor can be changed in a simple manner. The driving rotational field can, for example, be varied in terms of voltage.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
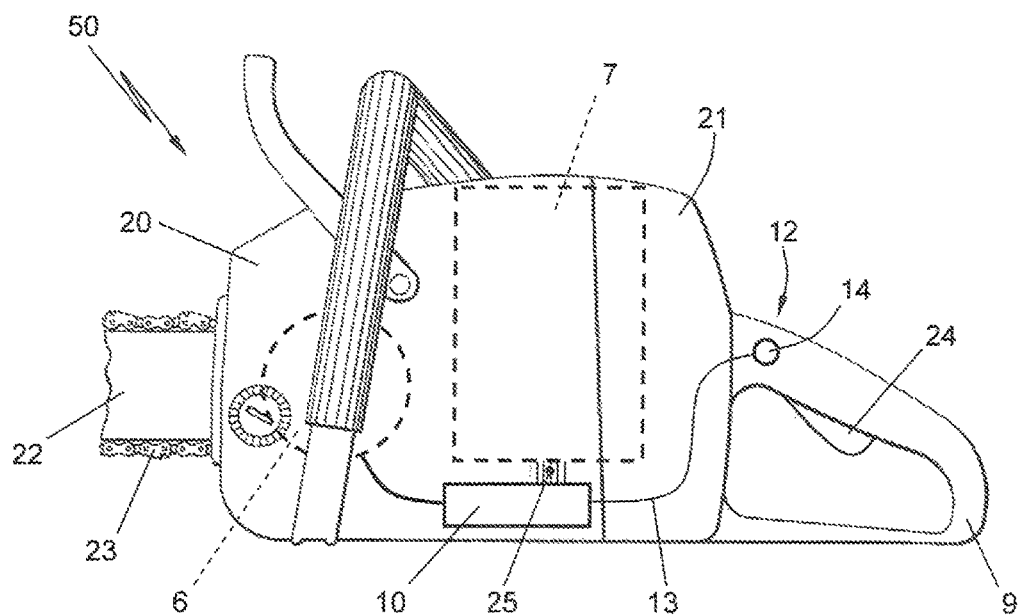
FIG. 1 is a schematic of a chain saw as an example of a work apparatus having a rechargeable battery pack as an energy source.
Figure 2:
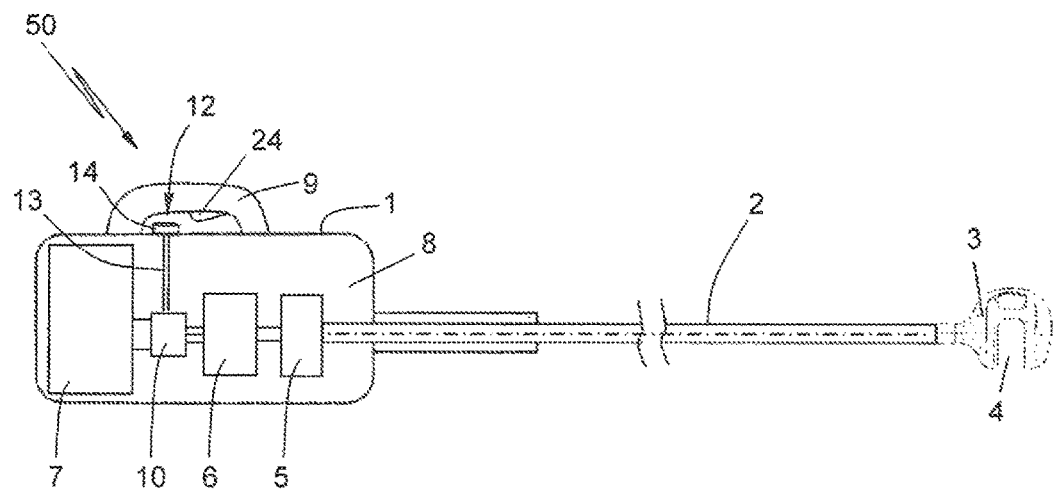
FIG. 2 is a schematic of a harvesting apparatus for shaking branches as a further example of a work apparatus operated with a rechargeable battery pack.

FIGS. 1 and 2 show examples of work apparatuses 50 having a rechargeable battery pack 7 as an energy source.

The work apparatus 50 shown in FIG. 1 is a chain saw 20 having a housing 21 in which an electric motor 6 is provided as a drive motor for a tool. The tool is a saw chain 23 which circulates about a guide bar 22. The electric motor 6 is fed by a rechargeable battery pack 7 as an energy source which is inserted into the housing 21 of the work apparatus 50. A control unit 10 controls the electric motor 6, which advantageously is an electronically commutated electric motor 6, whose driving rotational field is generated by the control unit 10. The control unit 10 is connected via communications and energy lines 25 to the rechargeable battery pack 7 which in the exemplary embodiment is advantageously made, for example, of individual cells chemically based on lithium and, at high power, ensures a long operating time of the work apparatus 50 which is supplied with energy via the rechargeable battery pack 7; rechargeable battery packs made of NiCd-cells, NiMh-cells or cells of another chemical structure can also be practical.

A pivot lever or a linearly movable adjusting element, which can be configured as a rotational speed setter, for example, in the form of an adjustable potentiometer 26 (FIG. 3) or the like, is provided as an operator-controlled element 24 for the operating rotational speed of the driving electric motor 6 in a work apparatus 50.

The work apparatus 50 shown in FIG. 2 is a harvesting apparatus 1 which is intended for shaking branches, twigs or the like which carry fruits. Such a shaker is essentially made of a snaking rod 2 which at its one end has a hook 3 with a hook opening 4 for threading a branch and at its other end is connected to a drive 5 for generating a shaking vibration. The drive 5 can be configured as an eccentric drive, crank drive or the like.

An electric motor 6, which is connected to a voltage source 11 (FIG. 3) via a control unit 10, is flange-connected to the drive entrance. In the shown embodiment, the voltage source is a rechargeable battery pack 7; alternatively, a mains connection can be provided.

The drive 5, the electric motor 6, the control unit 10 and the rechargeable battery 7 are arranged in a housing 8 which has a handle 9 for the user to carry the harvesting apparatus. A pivot lever is provided in the handle as the operator-controlled element 24 for the operating rotational speed of the driving electric motor 6; the pivot lever can foe configured as a rotational speed setter, for example, in the form of an adjustable potentiometer 26 (FIG. 3) or the like.

The shown work apparatuses 50 are given as an example and serve to illustrate the invention; the work apparatus 50 can also be configured as a cut-off machine, a hedge trimmer, a blower apparatus or similar work apparatus.

Figure 3:
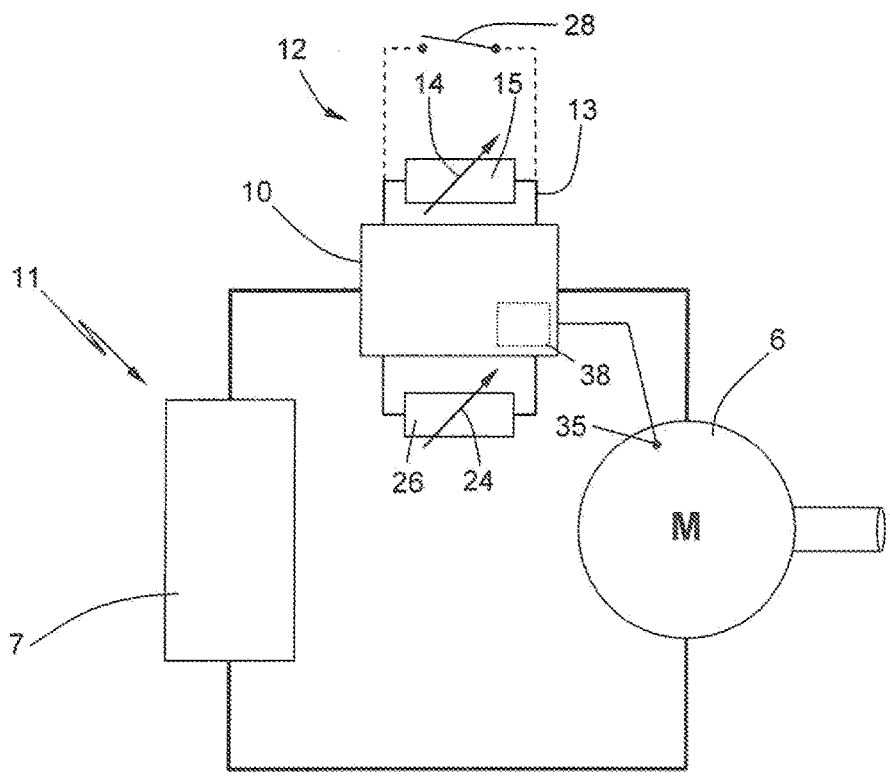
FIG. 3 is a schematic circuit of an electric motor connected to a voltage source as a drive motor in a work apparatus; and, FIG. 4 is a graph of the power characteristic line of the electric motor according to FIG. 3 plotted with respect to the rotational speed.

As FIG. 3 shows, the electric motor 6 is connected to the voltage source 11 which is formed by a rechargeable battery pack 7 and forms an energy source for operating the work apparatus 50. The electric motor 6, which advantageously is an electronically commutated electric motor, is controlled by the control unit 10 which impresses a power characteristic line with respect to the rotational speed (n) on the electric motor 6.

Figure 4:
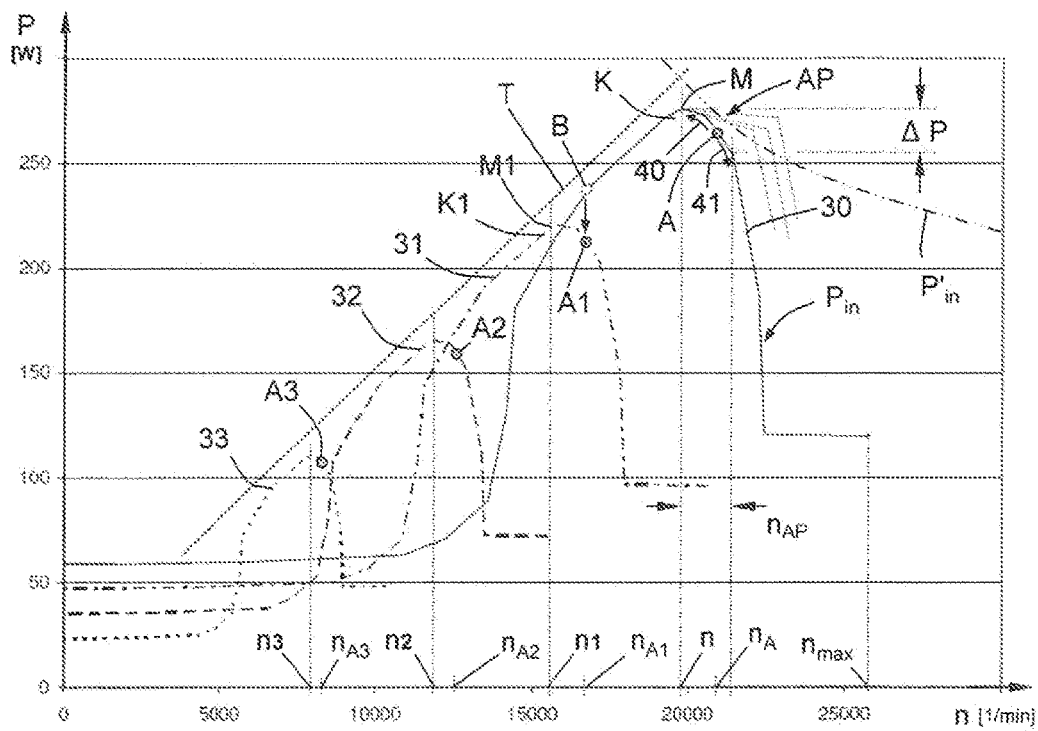

As shown in FIG. 4, the electric motor 6 has a physically predetermined general power characteristic line $P_{in}$, which essentially consumes a negligibly small amount of power P at a nominal rotational speed of, for example, 30,000 l/min and, at a rotational speed (n) near zero, has very high power consumption. This power characteristic line $P'_{in}$ is formed via the control unit 10 in such a manner that a characteristic line 30 with a pronounced maximum M is formed, which, for example, lies in the range of an operating rotational speed of approximately 20,000 l/min. The maximum M is electronically configured in such a manner that a pronounced apex region K results; an operating point A of the electric motor 6 should generally lie beyond the maximum M. The result is that, during operation of the work apparatus 50 with increasing load and thus with decreasing rotational speed (n), the operating point A shifts in the direction of arrow 40 to the maximum M while, in the case of decreasing load and thus increasing rotational speed (n), the operating point A moves away from the maximum M in the direction of the arrow 41. The curve section which, with increasing rotational speed (n), follows the maximum M can also be referred to as the operating plateau AP which extends over a rotational speed range $n_{AP}$. The shape of the operating plateau AP is thereby provided in such a manner that the power P changes in only a narrow region ΔP or is essentially the same over the rotational speed range $n_{AP}$.

During operation of, for example, a chain saw 20 according to FIG. 1, the user presses the guide bar 22 into the cut with corresponding force so that the saw chain cuts. If the user presses too hard, the rotational speed drops. Below the rotational speed of the power maximum, the power drops off (excessive pressing); if the user presses too little, the load of the electric motor is too low, which is why the rotational speed greatly increases and this, because of the configured characteristic line, leads to a large power drop after the end of the operating plateau.

Through this configuration of the characteristic line 30, an improved guiding of the work apparatus 50 is possible for the user because the user can easily run up to and maintain the operating point A on the operating plateau AP. If the load, for example, at the hook 3 (harvesting device according to FIG. 2) becomes too great, the rotational speed (n) drops and the power P increases up to the power maximum; if the load is too small, the rotational, speed (n) increases and the power P is reduced. The user notices these reactions during operation so that the user can adapt the guiding of the work apparatus 50 correspondingly.

The formed operating plateau AP can be configured differently according to FIG. 4. As indicated in the top right in FIG. 4, the operating plateau AP can be configured in a straight line, bent, or in another suitable manner over its rotational speed range $n_{AP}$. Likewise, the upward slope of the operating plateau AP over the rotational speed, range $n_{AP}$ can be the same, change rapidly or change continuously. The total upward slope is thereby selected so that the power P changes only in a narrow region ΔP or is essentially the same over the rotational speed range $n_{AP}$.

The work apparatus 50 configured as a harvesting device 1 according to the embodiment of FIG. 2 is used with different fruit having different degrees of ripeness. In dependence upon fruit to be harvested, its degree of ripeness and strength of the branch to be shaken, different shaking vibrations (shaking frequencies) are expedient, which is why the user will set the working rotational speed of the electric motor 5 correspondingly.

For this, according to the invention, a setting device 12 is provided on the work apparatus 50, in the embodiment the setting device being configured as an electric setting device and being connected to the control unit 10 via lines 13. The setting device 12 can provide the control unit 10 with a setting value according to which the control unit 10 modifies the power characteristic line 30 in such a manner that the position of the power maximum M with respect to the rotational speed (n) and in particular the position of the operating plateau with respect to the rotational speed (n) change.

The setting device 12 can be an adjusting member 14 (FIG. 2), for example a rotatable knob or a slide control which is expediently disposed on the outer side of the housing 8 and is, for example, configured as a potentiometer 15, as indicated in FIG. 3. Advantageously, the adjusting member 14 lies in the immediate area of a handle 9 of the work apparatus 50, so that the user can activate the electrical setting device 12 with the hand holding the handle during operation of the electric motor 6.

By adjusting the adjusting member 14 of the setting device 12, the control unit 10 is given a modified setting value according to which it, for example, changes the characteristic line 30 in the coordinate system of rotational, speed (n) and power P (FIG. 4.), for example transforms it into a characteristic line 31 which in relation to the initial, electronically formed power characteristic line 30 is modified, advantageously shifted, scaled or otherwise modified, in the direction of the axis of the rotational speed (n) as well as in the direction of the axis of the power P. It can be practical to scale the characteristic line 30 only in the direction of the axis of the rotational speed (n) or to modify or scale the characteristic line in the direction of the axis of the rotational speed (n) and in the direction of the axis of the power P by different magnitudes, whereby advantageously in each case an identical power characteristic which is given by the form of the characteristic line is maintained. Each characteristic line (30, 31, 33, 33) shows a pronounced power maximum M with respect to the rotational speed (n), wherein the operating plateau AP follows the power maximum with an operating point A with increasing rotational speed (n). If, in the case of an initial characteristic line, the maximum M of the rotational speed (n) is at approximately 20,000 l/min, the maximum M of the rotational speed in a modified or scaled characteristic line 31 is now—see FIG. 4—in the range of approximately 15,000 l/min corresponding to the set value prespecified by the user. The shape of the formed apex region K1 of the characteristic line 31 corresponds—with modified absolute values—approximately to the apex region K of the initial characteristic line 30. Even in the case of a scaled characteristic line 31, an operating plateau AP is formed with increasing rotational speed after the maximum M1, the shape of the operating plateau corresponding to the operating plateau AP of the initial characteristic line 30. This enables again the position selected by the user of the operating point A1 on the operating plateau, wherein the operating point A1—in the case of increasing rotational speed—lies beyond the maximum M1 of the power P and can be easily run up to and maintained by the user by operating the operating element 24. Even this operating point A1 is distinguished by the fact that, in the case of increasing load, the rotational speed only drops a little and the output power increases while, with decreasing load, the rotational speed increases and the power decreases. The power P changes only slightly or remains essentially the same over the rotational speed range of the operating plateau AP.

The modification of the initial characteristic line 30 for setting a stable operating point is done in such a manner that a maximum power is achieved with a thermally healthy electric motor. For this reason, it is provided that all characteristic lines 30 to 33 lie below a thermally permissible power characteristic line T. It can be practical to allow the thermal power characteristic line T to be exceeded temporarily.

If the user were to run up to a corresponding operating point B on the unchanged initial characteristic line 30, then this operating point B would be very difficult to maintain. With an increasing load and falling rotational speed (n), the power P of the electric motor also falls in accordance with the characteristic line section in front of the power maximum M, as a result of which the operating point B on the characteristic line 30 slips further downward, that is, the power P is also reduced further so that a significant dip in rotational speed is unavoidable. If, however, the reduced load decreases, the rotational speed (n) and, on account of the position of the operating point B in front of the maximum power P, the power consumption of the electric motor 6 also increase. Scaling the characteristic line 30 to the characteristic line 31 results in a stable operating point A1 now being formed at the same rotational speed at operating point 8 with the operating point A1 lying on a curve section of the operating plateau AP which hardly changes with an increasing rotational speed and turning into a significantly falling curve section only at its end as a result of which the operating point A1 can be easily run up to and maintained by the user.

A characteristic line 32 or a characteristic line 33 is formed in a corresponding manner by adjusting the setting device 12 and the setting value, which is changed as a result, using the control unit 10, so that the user can always set and run up to a stable operating point (A, A1, A2, A3) at different rotational speeds (n) depending on the type of work apparatus 50 and its intended use.

According to a feature of the invention, a button 28 (FIG. 3) can be provided, the user pressing this button as an "OK button" when he has set the desired working rotational speed using the operating element 24. The motor rotational speed which corresponds to the position of the operating element 24 is advantageously detected by means of a rotational speed sensor 35 and is supplied to the control unit 10 which then stores the motor rotational speed as the desired working rotational speed and performs the corresponding adjustment of the characteristic line 30. The stored working rotational speed can be deleted, for example, by pressing the button 28 once again.

In a further embodiment of the invention, an electronics system 38 can be provided which is purposefully integrated in the control unit 10 and initiates automatic adjustment of the characteristic line 30. If, for example, the user operates the work apparatus over a predefined period of time at a largely identical rotational speed (it being possible to determine this by monitoring the output signal from the rotational speed sensor 35 or by using information relating to the rotational speed which is already present in the control unit 10), the electronics system 38 prompts storage of this identical rotational speed as the selected working rotational speed, as a result of which the control unit 10 adjusts the characteristic line 30 in accordance with the stored, selected working rotational speed.

Automatic adjustment of the characteristic line 30 in dependence on the duration of a motor rotational speed, which is selected by the user, can be continuously active. If the user operates the work apparatus at another working rotational speed for a predetermined time period, the electronics system 38 again prompts the current motor rotational speed to be assumed as a new working rotational speed in the memory, and the control unit 10 adjusts the characteristic line in accordance with the new working rotational speed.

Automatic adjustment of the characteristic line or deletion of a setting of the characteristic line can be performed in dependence on the signal from a sensor, for example, a rotation rate sensor, pressure sensor, temperature sensor, capacitive and/or inductive sensor or the like.

As an alternative or in addition, provision can be made for the stored working rotational speed to be deleted by pressing the button 28.

The electric motor 6 is preferably an electronically commutated electric motor, it being possible to change the driving rotating field of this electric motor using the control unit 10 in such a way that the characteristic lines (30, 31, 32, 33) illustrated in FIG. 4 are formed. The configuration of the characteristic line which can also be called the power characteristic which is impressed on the electric motor can be achieved by, for example, the voltage of the driving rotating field being changed, for example by pulsewidth modulation of the voltage.

It is understood that the foregoing description is that of the preferred embodiments of the invention and that various changes and modifications may be made thereto without departing from the spirit and scope of the invention as defined in the appended claims.

What is claimed is:

1. A handheld work apparatus having an operating rotational speed range (AD) comprising:
   a work tool;
   an electric motor configured to drive said work tool;
   an energy source configured to supply a voltage to said electric motor;
   a control unit;
   said electric motor being connected to said energy source via said control unit and having a power characteristic line;
   said power characteristic line being electronically formed as a function of rotational speed (n) for said electric motor by said control unit and having a pronounced maximum (M) and an operating plateau (AP) lying in said operating rotational speed range (AD) of the work apparatus;
   said operating plateau (AP) connecting to said pronounced maximum (M) of said power characteristic line of said electric motor with increasing rotational speed (n);
   said operating plateau (AP) expanding over said rotational speed (n) to have a rotational speed width ($n_{AP}$);
   an electrical setting device configured to provide a set value;

said electrical setting device being configured to be operated by a user to adjust the set value;

said electrical setting device being configured to, in response to an adjustment of the set value by the user, shift the position of said operating plateau (AP) out of a first rotational speed range (n, $n_A$) of the electronically formed power characteristic line into a second rotational speed range (n1, $n_{A1}$) of the electronically formed power characteristic line in response to user input, said control unit being operatively connected to said electrical setting device; and, said electronically formed power characteristic line being changed so as to cause electric power ($P_{in}$) drawn by the electric motor to lie below a thermal power limit of the electric motor.

2. The work apparatus of claim 1, wherein said electrical setting device is configured to be adjustable during operation of said electric motor.

3. The work apparatus of claim 1, wherein:

said setting device is configured to set an operating rotational speed arbitrarily selected by the user;

said operating rotational speed selected by the user corresponds to an operating point (A, A1, A2, A3) which in each case lies on an operating plateau (AP) of said characteristic line adjusted to the selected operating rotational speed.

4. The work apparatus of claim 1 further comprising:

a housing;

an adjusting member arranged on said housing; and, said setting device being configured to be actuated via said adjusting member.

5. The work apparatus of claim 1, wherein:

said electric motor is an electronically commutated electric motor configured to generate a driving rotational field; and, said control unit is configured to modify said driving rotational field of said electric motor.

6. The work apparatus of claim 1, wherein said energy source is configured to supply said electric motor with a variable voltage.

7. The work apparatus of claim 6, wherein said voltage supplied to said electric motor is variable via pulsewidth modulation.

8. A method for operating an electric motor in a work apparatus, the electric motor having an electronically formed power characteristic line electronically formed as a function of rotational speed and impressed on the electric motor by a control unit, the electronically formed power characteristic line of the electric motor being formed between a lower rotational speed of the electric motor and an upper rotational speed of the electric motor, the electronically formed power characteristic line providing a power characteristic having a pronounced maximum (M) between the lower rotational speed and the upper rotational speed, the method comprising the steps of:

forming said electronically formed power characteristic line to have an operating plateau (AP) disposed in an operating rotational speed range (AD) of the electric motor;

said operating plateau (AP) having an expansion over the rotational speed corresponding to a rotational speed width ($n_{AP}$);

connecting said operating plateau (AP) with increasing rotational speed to said pronounced maximum (M) of said electronically formed power characteristic line of said electric motor;

expanding said operating plateau (AP) of said electronically formed power characteristic line over said rotational speed (n) to have a rotational speed width ($n_{AP}$);

shifting the position of the operating plateau (AP) on said electronically formed power characteristic line of said electric motor by said control unit out of a first rotational speed range (n; $n_A$) into a second rotational speed range (n1, $n_{A1}$) of said electronically formed power characteristic line of the electric motor; and, said electronically formed power characteristic line being changed so as to cause drawn electric power ($P_{in}$) of the electric motor to lie below a thermal power limit (T) of the electric motor.

9. The method of claim 8, wherein said shifting of the position of the operating plateau (AP) is performed with an otherwise unchanged power characteristic of the power characteristic line.

10. The method of claim 8, wherein said shifting of the position of the operating plateau (AP) with respect to the rotational speed (n) is achieved by setting a desired rotational speed range (AD).

11. The method of claim 8, wherein said shifting of the position of the operating plateau (AP) with respect to the rotational speed (n) is achieved by setting a desired operating rotational speed ($n_A$, $n_{A1}$, $n_{A2}$, $n_{A3}$).

12. The method of claim 8 further comprising the steps of:

preselecting one of an operating rotational speed range (AD) and an operating rotational speed ($n_A$, $n_{A1}$, $n_{A2}$, $n_{A3}$);

scaling the power characteristic line to said one of the preselected operating rotational speed range (AD) and the preselected operating rotational speed ($n_A$, $n_{A1}$, $n_{A2}$, $n_{A3}$).

13. The method of claim 8 further comprising the step of scaling the power characteristic line in the direction of the axis of the rotational speed or in the direction of the axis of the rotational speed and in the direction of the axis of the power.

14. The method of claim 13, wherein the power characteristic line is scaled with the same ratio.

15. A method of operating an electric motor in a work apparatus, the electric motor having an electronically formed power characteristic line electronically formed as a function of rotational speed and impressed on the electric motor by a control unit, the electronically formed power characteristic line of the electric motor being formed between a lower rotational speed of the electric motor and an upper rotational speed of the electric motor, the method comprising the steps of:

forming said electronically formed power characteristic line to provide a power characteristic having a pronounced maximum (M) and an operating plateau (AP) lying in an operating rotational speed range (AD) of the electric motor;

with increasing rotational speed, connecting said operating plateau (AP) to said pronounced maximum (M) of said electronically formed power characteristic line of said electric motor;

expanding said operating plateau (AP) of said electronically formed power characteristic line over said rotational speed (n) to have a rotational speed width ($n_{AP}$); and, shifting the position of said operating plateau (AP) by said control unit out of a first rotational speed range (n; $n_A$) of said electronically formed power characteristic line into a second rotational speed range (n1, $n_{A1}$) of said electronically formed power characteristic line so as to cause said operating plateau (AP) to connect to the maximum of the drawn electric power ($P_{in}$) and to cause the electric power ($P_{in}$) drawn in the range of said rotational speed width ($n_{AP}$) to be constant as a function of the rotational speed (n) and with increasing rotational speed (n), the operating plateau (AP) to have an end whereat the electric power ($P_{in}$) drops off steeply with the increasing rotational speed (n).

16. The method of claim 15, wherein the position of said operating plateau (AP) is shifted to an otherwise unchanged power characteristic of the electronically formed power characteristic line.

17. The method of claim 15, wherein the position of said operating plateau (AP) over said rotational speed (n) is shifted by setting the operating rotational speed range (AD) to a desired operating rotational speed range.

18. The method of claim 15, wherein the position of said operating plateau (AP) over said rotational speed (n) is shifted by setting a desired operating rotational speed.

19. The method of claim 15, wherein said electronically formed power characteristic line is scaled with a preselected operating rotational speed range (AD) or with a preselected operating rotational speed of the work apparatus.

20. The method of claim 15, wherein said electronically formed power characteristic line is scaled in a direction of an axis of the rotational speed or in the direction of the axis of the rotational speed and in a direction of an axis of the electric power.

21. The method of claim 15, wherein said power characteristic line is changed so as to cause electric power ($P_{in}$) drawn by the electric motor to lie below a thermal power limit of the electric motor.

* * * * *

UNITED STATES PATENT AND TRADEMARK OFFICE
CERTIFICATE OF CORRECTION

PATENT NO. : 9,577,567 B2  
APPLICATION NO. : 13/758626  
DATED : February 21, 2017  
INVENTOR(S) : Oerding et al.

Page 1 of 1

It is certified that error appears in the above-identified patent and that said Letters Patent is hereby corrected as shown below:

In the Specification

In Column 2:  
Line 38: insert -- then -- before "drop".

In Column 4:  
Line 54: delete "snaking" and substitute -- shaking -- therefor.

In Column 5:  
Line 2: delete "foe" and substitute -- be -- therefor.

In Column 6:  
Line 14: delete "5" and substitute -- 6 -- therefor.

In Column 6:  
Line 52: delete "(30, 31, 33, 33)" and substitute -- (30, 31, 32, 33) -- therefor.

In Column 7:  
Line 39: delete "8" and substitute -- "B" -- therefor.

Signed and Sealed this  
Twenty-fifth Day of April, 2017

Michelle K. Lee  
*Director of the United States Patent and Trademark Office*